(12) United States Patent
Takahashi (10) Patent No.: US 8,382,290 B2
(45) Date of Patent: Feb. 26, 2013

(54) PROJECTOR AND METHOD OF CONTROLLING THE SAME

(75) Inventor: Tadao Takahashi, Oita (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 12/843,266

(22) Filed: Jul. 26, 2010

(65) Prior Publication Data

US 2011/0025982 A1 Feb. 3, 2011

(30) Foreign Application Priority Data

Aug. 3, 2009 (JP) ................................. 2009-180368

(51) Int. Cl.
*G03B 21/14* (2006.01)
(52) U.S. Cl. ............... 353/69; 353/57; 353/70; 359/651
(58) Field of Classification Search .................... 353/81, 353/51–70; 340/669, 683; 359/832, 651
See application file for complete search history.

(56) References Cited

U.S. PATENT DOCUMENTS

| 2006/0103811 A1* | 5/2006 | May et al. ........................ 353/69 |
| 2006/0285089 A1* | 12/2006 | Higashi ......................... 353/101 |
| 2007/0057779 A1* | 3/2007 | Battista et al. ............. 340/425.5 |
| 2010/0177283 A1 | 7/2010 | Tanaka |

FOREIGN PATENT DOCUMENTS

| CN | 101776837 A | 7/2010 |
| JP | A-2003-131118 | 5/2003 |
| JP | A-2003-133118 | 5/2003 |
| JP | A-2005-079939 | 3/2005 |

\* cited by examiner

*Primary Examiner* — Georgia Y Epps
*Assistant Examiner* — Jerry Brooks
(74) *Attorney, Agent, or Firm* — Oliff & Berridge, PLC (57) ABSTRACT

A projector adapted to project an image includes: a detection section adapted to detect a motion of the projector; a determination section adapted to compare a detection result of the detection section with a predetermined criterion to perform determination on whether the projector is in a moving state or in a resting state; an adjustment section adapted to begin adjustment of at least one projection condition of the image in response to a transition of a determination result of the determination section from the moving state to the resting state; an auxiliary operation section adapted to auxiliary support the projection of the image by performing an operation with vibration; and a criterion determination section adapted to change the criterion based on a operation state of the auxiliary operation section.

11 Claims, 7 Drawing Sheets

PROJECTOR AND METHOD OF CONTROLLING THE SAME

CROSS-REFERENCE

The present application claims priority from Japanese Patent Application No. 2009-180368 filed on Aug. 3, 2009, which is hereby incorporated by reference in its entirety.

BACKGROUND

In the projector for projecting an image, there are proposed various types of projectors provided with a function (an automatic adjustment function) of detecting installation conditions (e.g., a distance from a screen, the tilt of the projector), and performing a focus adjustment and an adjustment of projection conditions such as keystone distortion correction in accordance with the result of the detection. In such a projector as described above it is arranged that the automatic adjustment function starts when the user performs a predetermined operation.

In contrast, the projector described in Japanese Patent Publication No. 2003-133118 is provided with a motion detection sensor for detecting whether the projector is in a moving state or in a resting state, and is arranged so that the autofocus function automatically starts when the operation of adjusting the position of the projector, for example, is completed and the projector becomes in a resting state. In other words, according to the projector described in the document mentioned above, since it is not required to perform the operation for activating the autofocus function, convenience of the users is enhanced.

However, projectors contain elements generating vibrations such as cooling fans or speakers inside, and the vibration varies in accordance with, for example, the rotational speed of the fan or the volume of a sound produced by the speaker. Therefore, depending on the operation state of the fan or the speaker, the vibration thus generated might have influence on the determination between the moving state and the resting state, and might incur false detection.

SUMMARY

Various embodiments may solve at least a part of the problem described above, and the invention can be implemented as the following embodiments or application examples.

Application Example 1

According to at least one embodiment of disclosure, there is provided a projector adapted to project an image, including a detection section adapted to detect a motion of the projector, a determination section adapted to compare a detection result of the detection section with a predetermined criterion to perform determination on whether the projector is in a moving state or in a resting state, an adjustment section adapted to begin adjustment of a projection condition of the image in response to a transition of a determination result of the determination section from the moving state to the resting state, an auxiliary operation section adapted to auxiliary support the projection of the image by performing an operation with vibration, and a criterion determination section adapted to change the criterion based on a operation state of the auxiliary operation section.

According to the projector of this application example, the criterion determination section changes the criterion for determine whether the projector is in the moving state or in the resting state in accordance with the operation state of the auxiliary operation section. In other words, since the criterion is changed in accordance with the operation state of the auxiliary operation section, namely the amplitude of the vibration generated by the auxiliary operation section, it becomes possible to perform the determination for beginning the adjustment of the projection conditions more accurately.

Application Example 2

The projector of the above application example, wherein the auxiliary operation section includes a cooling fan adapted to cool the projector, and the criterion determination section changes the criterion in accordance with a rotational speed of the cooling fan.

According to the projector of this application example, since the criterion determination section changes the criterion in accordance with the rotational speed of the cooling fan, it becomes possible to prevent the false determination due to the vibration of the cooling fan when performing the determination for beginning the adjustment of the projection conditions.

Application Example 3

The projector of the above application example, wherein the detection section includes an angular velocity sensor adapted to detect an angular velocity, the determination section compares the angular velocity detected by the detection section and the criterion with each other to determine whether the projector is in the moving state or in the resting state, and the criterion determination section sets the criterion so that the higher the rotational speed of the cooling fan is, the higher the criterion is.

Application Example 4

The projector of the above application example, wherein the detection section includes an acceleration sensor adapted to detect an acceleration, the determination section compares the acceleration detected by the detection section and the criterion with each other to determine whether the projector is in the moving state or in the resting state, and the criterion determination section sets the criterion so that the higher the rotational speed of the cooling fan is, the higher the criterion is.

Application Example 5

The projector of the above application example, wherein the auxiliary operation section includes a sound production section adapted to produce a sound, and the criterion determination section changes the criterion in accordance with a volume of the sound produced by the sound production section.

According to the projector of this application example, since the criterion determination section changes the criterion in accordance with the volume of the sound, it becomes possible to prevent the false determination due to the vibration of the sound production section when performing the determination for beginning the adjustment of the projection conditions.

Application Example 6

The projector of the above application example, wherein the detection section includes an angular velocity sensor adapted to detect an angular velocity, the determination section compares the angular velocity detected by the detection section and the criterion with each other to determine whether the projector is in the moving state or in the resting state, and the criterion determination section sets the criterion so that the higher the volume of the sound is, the higher the criterion is.

Application Example 7

The projector of the above application example, wherein the detection section includes an acceleration sensor adapted to detect an acceleration, the determination section compares the acceleration detected by the detection section and the criterion with each other to determine whether the projector is in the moving state or in the resting state, and the criterion determination section sets the criterion so that the higher the volume of the sound is, the higher the criterion is.

Application Example 8

The projector of the above application example, wherein the adjustment section corrects keystone distortion of the image.

Application Example 9

The projector of the above application example, wherein the adjustment section adjusts a focus condition of the image.

Application Example 10

The projector of the above application example, wherein the adjustment section adjusts a zoom condition of the image.

Application Example 11

According to at least one embodiment of the disclosure, there is provided a method of controlling a projector adapted to project an image, including the steps of (a) performing determination on whether the projector is in a moving state or in a resting state by detecting a motion of the projector to compare the motion with a predetermined criterion, (b) beginning an adjustment of a projection condition of the image in response to a transition of a determination result in step (a) from the moving state to the resting state, and (c) changing the criterion based on an operation state of an auxiliary operation section adapted to auxiliary support the projection of the image by performing an operation with vibration.

According to the method of controlling a projector of this application example, in the step (c) the criterion for determine whether the projector is in the moving state or in the resting state is changed in accordance with the operation state of the auxiliary operation section. In other words, since the criterion is changed in accordance with the operation state of the auxiliary operation section, namely the amplitude of the vibration generated by the auxiliary operation section, it becomes possible to perform the determination for beginning the adjustment of the projection conditions more accurately.

Further, in the case in which the projector and the method of controlling a projector described above are configured using the computer provided to the projector, the application example described above can be configured as a program for realizing the function, or a recording medium storing the program in a computer readable manner. As the recording medium, there can be used various types of computer readable media such as a flexible disk, a hard disk, an optical disc such as a CD or a DVD, a magneto-optical disc, a memory card or a USE memory mounting a non-volatile semiconductor memory device, or the internal storage device (a semiconductor memory such as a RAM or a ROM) of the projector.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENT

Hereinafter, a projector according to the present embodiment will be explained with reference to the accompanying drawings. Projectors are the optical devices for modulating light beams emitted from light source devices to form images (hereinafter referred to as "input images") based on the image information input from the outside, and then projecting the images on, for example, screens or whiteboards (hereinafter simply referred to as "screens"). The projector according to the present embodiment is provided with projection conditions adjustment function for adjusting the projection conditions of an image in accordance with the installation environment of the projector so as to be able to adjust (correct) the keystone distortion caused in the case of projecting an image in a direction tilted with respect to the screen in addition to the focus state and the zoom state of the image.

Figure 1:
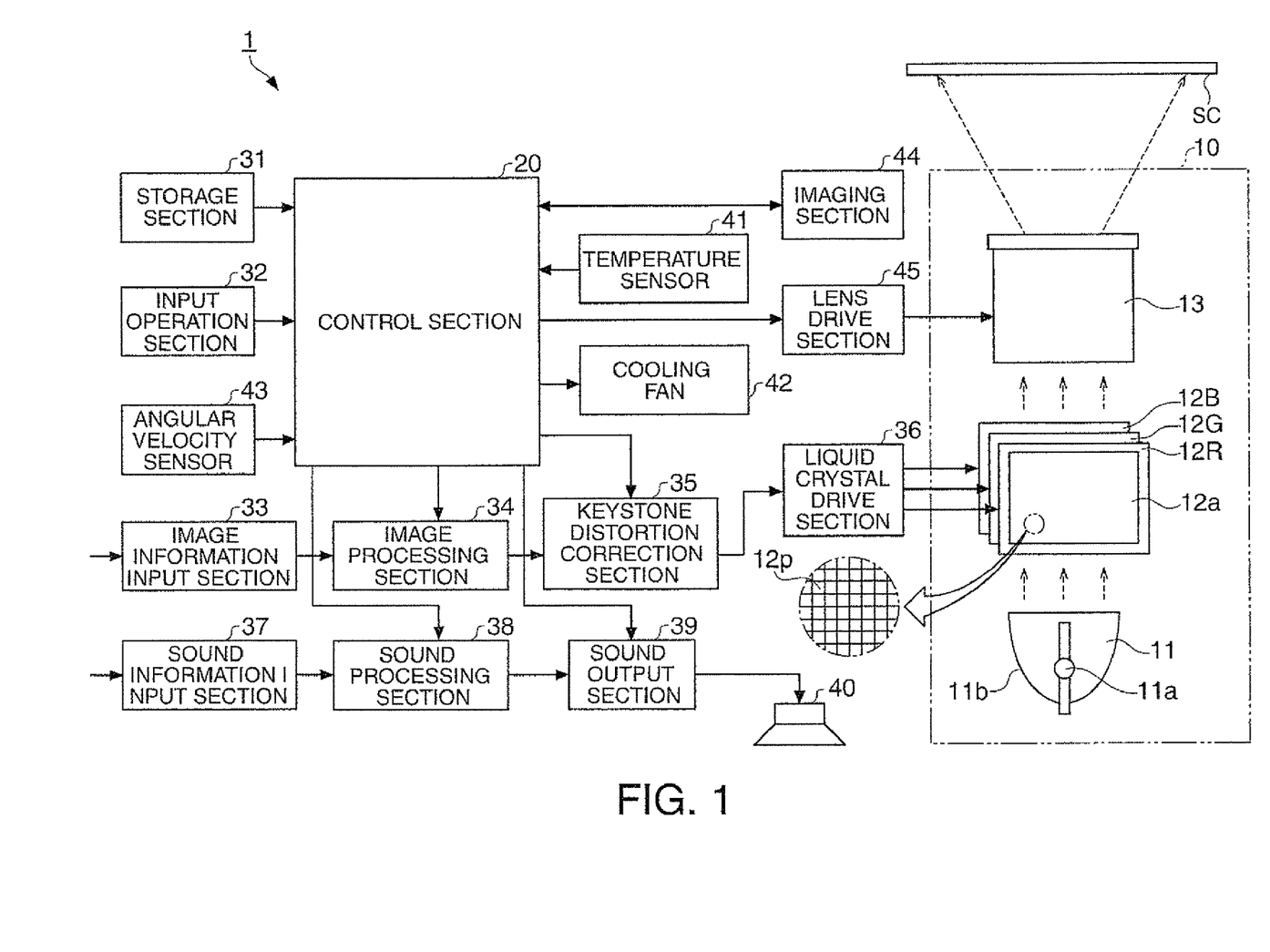
FIG. 1 is a block diagram showing a schematic configuration of a projector.

FIG. 1 is a block diagram showing a schematic configuration of the projector.

As shown in FIG. 1, the projector 1 is provided with an image projection section 10, a control section 20, a storage section 31, an input operation section 32, an image information input section 33, an image processing section 34, a keystone distortion correction section 35, a liquid crystal drive section 36, a sound information input section 37, a sound processing section 38, a sound output section 39, a speaker 40, a temperature sensor 41, a cooling fan 42, an angular velocity sensor 43, an imaging section 44, a lens drive section 45, and so on.

The image projection section 10 is composed mainly of a light source device 11, three liquid crystal light valves 12R, 12G, and 12B as a light modulation device, and a projection lens 13 as a projection optical system. The image projection section 10 corresponds to a display section, modulates the light emitted from the light source device 11 with the liquid crystal light valves 12R, 12G, and 12B to form an image (image light), and then projects the image through the projection lens 13 in an enlarged manner to thereby display the image on an external projection screen SC or the like.

The light source device 11 is configured including a discharge light source lamp 11a formed of, for example, a super-high pressure mercury lamp or a metal halide lamp, and a reflector 11b for reflecting the light, which is emitted by the light source lamp 11a, toward the liquid crystal light valves 12R, 12G, and 12B. The light emitted from the light source 11 is converted into the light having a substantially even intensity distribution by an integrator optical system not shown, and is separated into colored light components of red (R), green (G), and blue (B), the three primary colors of light, by a color separation optical system not shown, and the colored light components subsequently enter the liquid crystal light valves 12R, 12G, and 12B, respectively.

The liquid crystal light valves 12R, 12G, and 12B are each composed mainly of a liquid crystal panel having a liquid crystal material encapsulated between a pair of transparent substrates. The liquid crystal light valves 12R, 12G, and 12B are each provided with a rectangular pixel area 12a composed of a plurality of pixels 12p arranged in a matrix, and arranged so that a drive voltage can be applied to the liquid crystal material of the pixel 12p pixel-by-pixel. Further, when the drive voltage corresponding to the image information input thereto is applied to each of the pixels 12p due to the drive of the liquid crystal drive section 36, each of the pixels 12p is set to have a light transmission rate corresponding to the image information. Therefore, the light emitted from the light source device 11 is modulated while being transmitted through the liquid crystal light valves 12R, 12G, and 12B, thus the image light beams corresponding to the image information are formed for the respective colored light. The image light beams of the respective colors are combined for each of the pixels 12p by a color combining optical system, not shown, to be formed as a color image light beam, and then projected in an enlarged manner through the projection lens 13. It should be noted that the projection lens 13 is configured including a plurality of lens groups, and is also provided with a focus mechanism (not shown) and a zoom mechanism (not shown) each driven by the lens drive section 45.

The control section 20 is provided with a central processing unit (CPU), a random access memory (RAM) used for temporarily storing various data, and so on (none of them shown), and operates along a control program stored in the storage section 31, thereby performing the overall control of the operation of the projector 1. In other words, the control section 20 functions as a computer together with the storage section 31.

The storage section 31 is formed of a non-volatile memory such as a mask read-only memory (ROM), a flash memory, a ferroelectric memory (FeRAM). The storage section 31 stores the control program for controlling the operation of the projector 1, various setting data for defining, for example, operational conditions of the projector 1, and so on.

The input operation section 32 is for receiving an input operation of the user, and is provided with a plurality of operation keys for the user to provide various instructions to the projector 1. As the operation keys provided to the input operation section 32, there are cited, for example, a power key for switching between ON and OFF of the power, a menu key for making a menu image for various settings be displayed, and a volume key for adjusting the volume of a sound produced by the speaker 40. When the user operates the various operation keys of the input operation section 32, the input operation section 32 outputs an operation signal corresponding to the content of the operation by the user to the control section 20 in response to the input operation. It should be noted that it is also possible to adopt a configuration of using a remote controller (not shown) capable of a remote operation as the input operation section 32. In this case, the remote controller emits an operation signal on an infrared ray corresponding to the content of the operation by the user, and then the remote control signal receiving section not shown receives the operation signal and transmits it to the control section 20.

The image information is input to the image information input section 33 from an external image/sound output device such as a personal computer or various types of picture reproduction devices, and the image information input section 33 outputs the image information input thereto to the image processing section 34.

The image processing section 34 converts the image information (hereinafter also referred to as "input image information") input from the image information input section 33 into the image information representing the grayscales of respective pixels 12p of the liquid crystal light valves 12R, 12G, and 12B. Here, the image information thus obtained by the conversion is separated so as to correspond to the respective colored light beams of R, G, and B, and is constituted with a plurality of pixel values corresponding respectively to all of the pixels 12p of the liquid crystal light valves 12R, 12G, and 12B. The pixel values are for determining the light transmission rates of the corresponding pixels 12p, and define the intensity (grayscales) of the light emitted through the respective pixels 12p. Further, in accordance with the instruction of the control section 20, the image processing section 34 performs an image quality control process for controlling brightness, contrast, sharpness, color, and so on, and an on-screen display (OSD) process for overlapping an OSD image such as a menu image or a message image on the image information thus obtained by conversion, and outputs the image information thus processed to the keystone distortion correction section 35.

Further, in order for projecting a test image used when adjusting the projection conditions, the image processing section 34 is arranged to be able to output the image information corresponding to the test image based on an instruction of the control section 20. When the control section 20 instructs the image processing section 34 to project the test image, the image processing section generates the image information corresponding to the instruction of the control section 20 and outputs it to the keystone distortion correction section 35 regardless of the content of the input image information. For example, if the projection of a solid white image (an all-white image) is instructed as the test image, the image processing section 34 generates and then outputs the image information for making the light transmission rate of each of the pixels 12p become maximum.

The keystone distortion correction section 35 corrects the image information based on the instruction of the control section 20 in order for suppressing the keystone distortion caused when projecting an image in an oblique direction with respect to the screen SC. Specifically, the keystone distortion correction section 35 sets an image formation area having a shape capable of canceling the keystone distortion inside the pixel area 12a of the liquid crystal light valves 12R, 12G, and 12B based on correction information input from the control section 20. Subsequently, the keystone distortion correction section 35 corrects the image information input from the image processing section 34 so that the input image is formed in the image formation area, and then outputs the image information thus corrected to the liquid crystal drive section 36. It should be noted that in absence of the instruction from the control section 20 to correct the image information, the keystone distortion correction section 35 outputs the image information, which is input from the image processing section 34, directly to the liquid crystal drive section 36. In this case, the input image is formed across the pixel area 12a.

When the liquid crystal drive section 36 drives the liquid crystal light valves 12R, 12G, and 12B in accordance with the image information input from the keystone distortion correction section 35, the liquid crystal light valves 12R, 12G, and 12B form the images corresponding to the image information, and the images are projected through the projection lens 13.

The sound information is input to the sound information input section 37 from the external image/sound output device described above, and the sound information input section 37 outputs the sound information input thereto to the sound processing section 38.

The sound processing section 38 executes the process (e.g., sound quality control process) for controlling the output characteristic thereof on the sound information input from the sound information input section 37 along the instruction of the control section 20. The sound information on which the control process is performed in the sound processing section 38 is output to the sound output section 39.

The sound output section 39 is provided with an amplifier circuit not shown, and amplifies the sound information input from the sound processing section 38 based on the control of the control section 20, and then outputs it to the speaker 40 as a sound production section. Therefore, when the control section 20 makes the sound output section 39 amplify the sound information based on the volume setting value designated with the volume key of the input operation section 32, the sound based on the sound information input to the sound information input section 37 is produced from the speaker 40 at a volume level corresponding to the volume setting value thus designated.

The temperature sensor 41 is formed of, for example, a thermistor or the like, and detects the internal temperature of the projector 1, and then outputs the detection result to the control section 20. The temperature sensor 41 is disposed in a region generating heat or a region apt to be damaged by heat such as the light source device 11 or the liquid crystal light valves 12R, 12G, and 12B. Further, it is also possible to indirectly detect the internal temperature of the projector 1 by, for example, detecting the temperature of the air discharged from an exhaust port not shown instead of directly detecting the internal temperature of the projector 1.

The cooling fan 42 is formed of, for example, an axial fan or a sirocco fan. The cooling fan 42 rotates based on the control of the control section 20, thereby sucking in the external air from an intake port (not shown) to cool the inside of the projector 1, and discharging the air having been used for cooling from the exhaust port (not shown) to the outside. It should be noted that the cooling fan 42 can be composed of a plurality of fans, and is configured including, for example, a fan (intake fan) disposed adjacent to the intake port and a fan (exhaust fan) disposed adjacent to the exhaust port.

The angular velocity sensor (the gyro sensor) 43 is for detecting the motion of the projector 1, and detects the angular velocity along the instruction of the control section 20, and then outputs the detection result to the control section 20. When the angular velocity sensor 43 outputs the detection result (the angular velocity) to the control section 20, the control section 20 can determine whether the projector 1 is in the state (the moving state) of being moved by the user or in the state (the resting state) of being at rest based on the detection result.

The imaging section 44 is for imaging the front (the projection direction of images) of the projector 1, and is configured including a imaging element (not shown) formed of, for example, a charge coupled device (CCD) sensor or a complementary metal oxide semiconductor (CMOS) sensor, and an imaging lens (not shown) disposed in front of the imaging element. The imaging section 44 images a range including the image (projected image) projected from the projection lens 13 along the instruction of the control section 20, and then generates image data (hereinafter referred to as "imaging data") corresponding to the imaging result (the shot image). The imaging data generated by the imaging section 44 is output to the control section 20.

The lens drive section 45 drives the focus mechanism and the zoom mechanism of the projection lens 13 based on the instruction of the control section 20. Then, the lens drive section 45 changes the positional relationship between the optical axis directions of the respective lens groups, thereby performing an adjustment (a focus adjustment) of the focus condition and an adjustment (a zoom adjustment) of the zoom condition.

Figure 2:
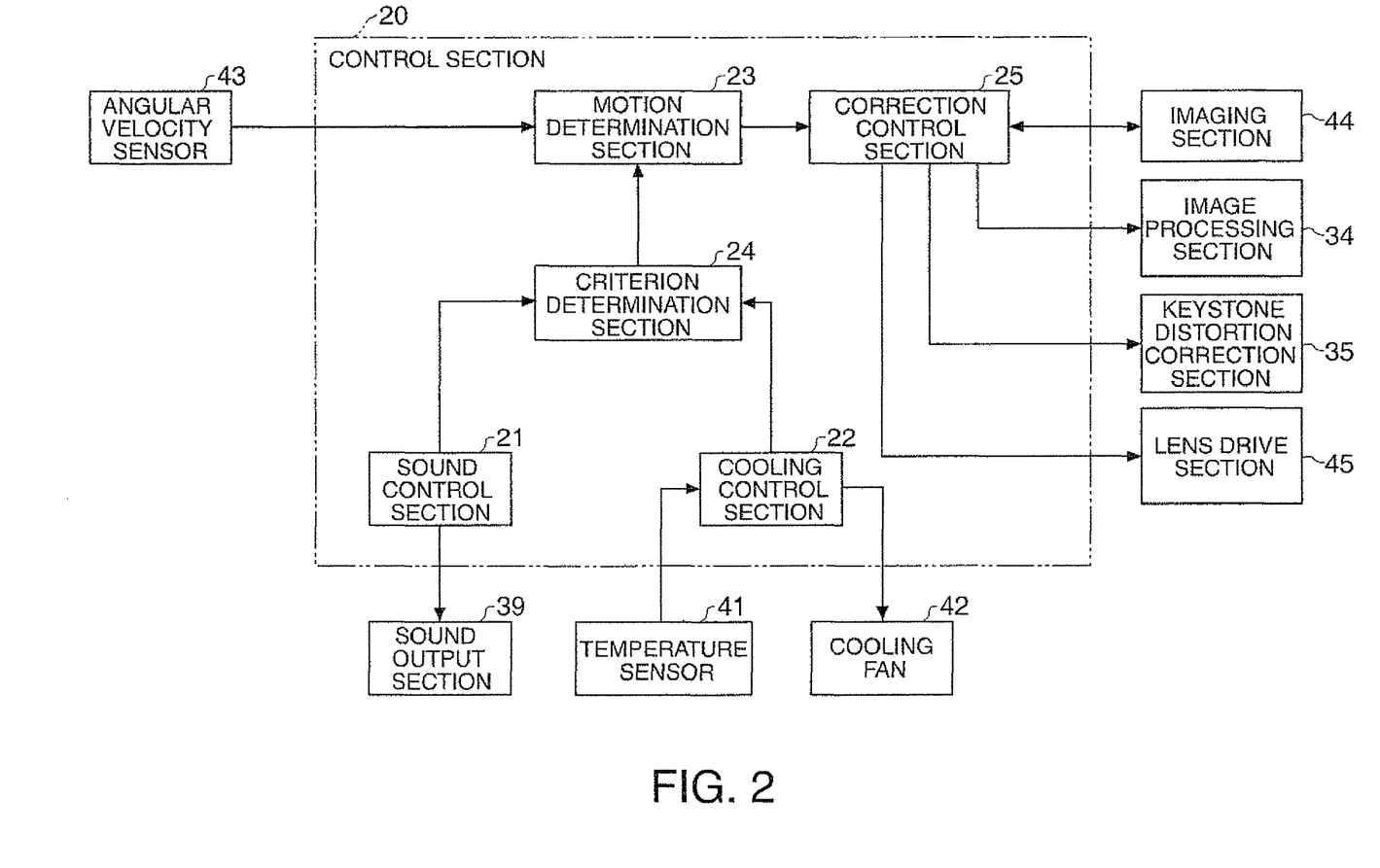
FIG. 2 is a functional block diagram showing the function of a control section.

FIG. 2 is a functional block diagram showing the function of the control section 20.

As shown in FIG. 2, the control section 20 is provided with a sound control section 21, a cooling control section 22, a motion determination section 23, a criterion determination section 24, a correction control section 25, and so on. It should be noted that these functions provided to the control section 20 can be realized by the CPU in the control section 20 operating along the control program, or by dedicated hardware.

The sound control section 21 controls the volume of the sound output from the speaker 40. Specifically, when the user operates the volume key of the input operation section 32 to thereby perform the adjustment of the volume (the volume setting value), the sound control section 21 stores the volume setting value having been adjusted by itself, and at the same time, outputs the volume setting value to the sound output section 39 to make the sound output section 39 perform output of the sound at the updated volume. It should be noted that it is assumed in the present embodiment that the larger the volume setting value is, the higher the volume becomes.

The cooling control section 22 controls rotation of the cooling fan 42 based on the detection result of the temperature sensor 41. Specifically, the cooling control section 22 determines the rotational speed (hereinafter also referred to as a "fan speed") of the cooling fan 42 based on the temperature detected by the temperature sensor 41 so that the higher the temperature is, the higher speed the cooling fan 42 rotates at, and makes the cooling fan rotate at that fan speed.

The motion determination section 23 determines whether the projector 1 is in the moving state or in the resting state based on the detection result of the angular velocity sensor 43. Specifically, the motion determination section 23 compares the angular velocity detected by the angular velocity sensor 43 with the criterion (the motion detection threshold value) determined by the criterion determination section 24, and then performs the determination based on the comparison result.

The criterion determination section 24 determines the criterion (the motion detection threshold value), which is used when the motion determination section 23 performs the determination between the moving state and the resting state, based on the volume setting value and the fan speed.

Figure 3:
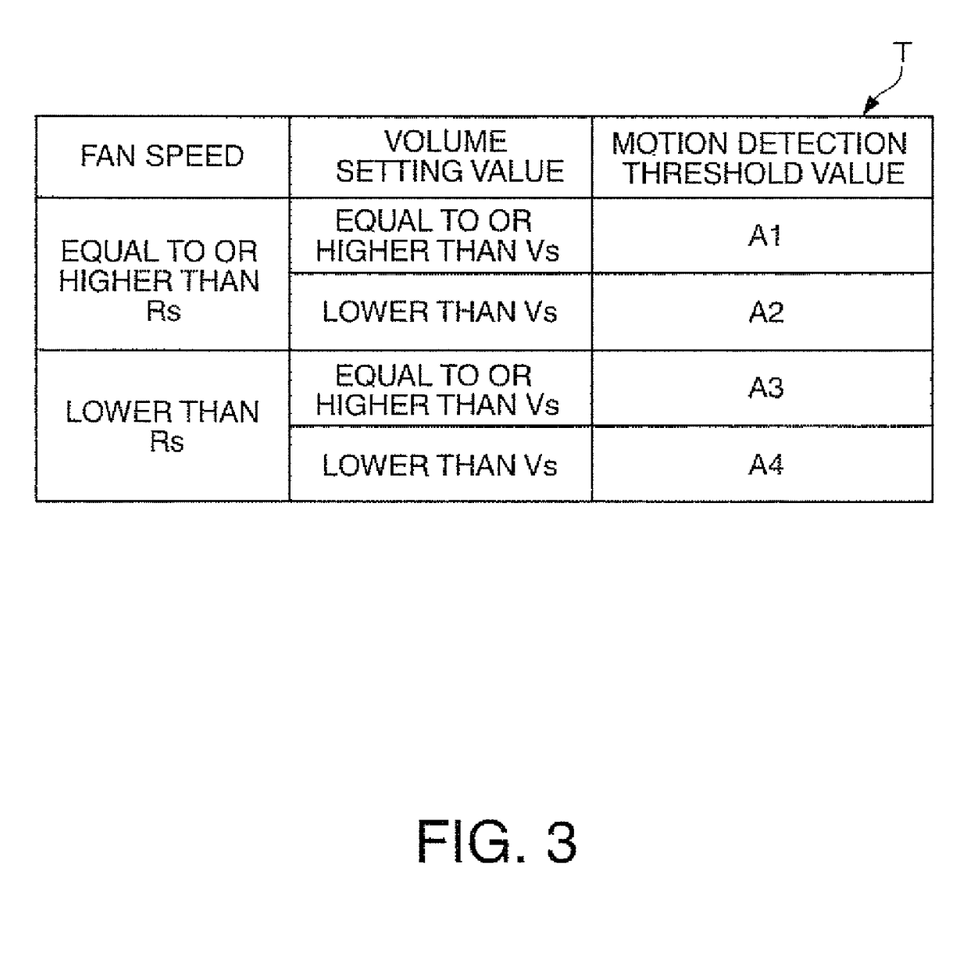
FIG. 3 is a correspondence table showing the relationship between a fan speed, a volume setting value, and a motion detection threshold value.

FIG. 3 is a correspondence table T showing the relationship between the fan speed, the volume setting value, and the motion detection threshold value, and the correspondence table T is held by the criterion determination section 24. The criterion determination section 24 determines the motion detection threshold value with reference to the correspondence table T based on the volume setting value notified from the sound control section 21 and the fan speed notified from the cooling control section 22.

As shown in FIG. 3, the motion detection threshold value is arranged to take a different value in accordance with whether or not the volume setting value thus notified is equal to or higher than a predetermined value (Vs), and whether or not the fan speed thus notified is equal to or higher than a predetermined value (Rs). Specifically, if the fan speed is equal to or higher than Rs, and the volume setting value is equal to or higher than Vs, the motion detection threshold value becomes A1, and if the fan speed is equal to or higher than Rs, and the volume setting value is lower than Vs, the motion detection threshold value becomes A2. Further, if the fan speed is lower than Rs, and the volume setting value is equal to or higher than Vs, the motion detection threshold value becomes A3, and if the fan speed is lower than Rs, and the volume setting value is lower than Vs, the motion detection threshold value becomes A4. Here, the relationship of A1>A2>A3>A4 is true between the four motion detection threshold values A1, A2, A3, and A4. In other words, the higher the rotational speed of the cooling fan 42 is, namely the larger the vibration of the cooling fan 42 due to the rotational operation is, the larger the motion detection threshold value becomes. Similarly, the higher the volume setting value is, namely the larger the vibration of the speaker 40 due to the sound output is, the larger the motion detection threshold value becomes.

Figure 4A:
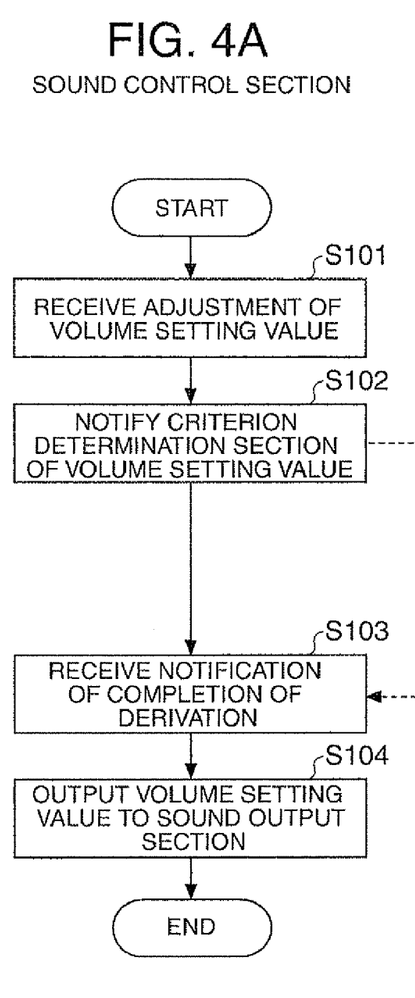
FIGS. 4A and 4B are flowcharts for explaining the operations of a sound control section and a criterion determination section when determining the motion detection threshold value.
Figure 4B:
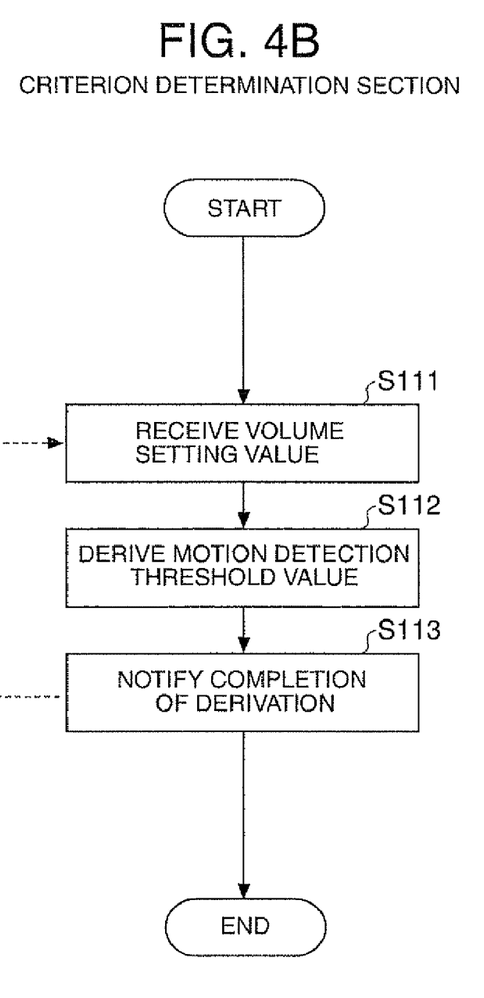

FIGS. 4A and 43 are flowcharts for explaining the operations of the sound control section 21 and the criterion determination section 24 when determining the motion detection threshold value, wherein FIG. 4A shows the operation of the sound control section 21, and FIG. 4B shows the operation of the criterion determination section 24. The sound control section 21 performs the process along the flow shown in FIGS. 4A and 4B every time the user performs the adjustment of the volume.

As shown in FIGS. 4A and 4B, when the user adjusts the volume setting value, the sound control section 21 receives the adjustment (step S101). Subsequently, the sound control section 21 notifies the criterion determination section 24 of the volume setting value prior to outputting the volume setting value having been adjusted to the sound output section 39 (step S102). When receiving (step S111) the volume setting value notified by the sound control section 21, the criterion determination section 24 derives (step S112) a renewed motion detection threshold value from the correspondence table T based on the volume setting value and the fan speed having ever been received from the cooling control section 22, and then stores the renewed motion detection threshold value. Subsequently, when the criterion determination section 24 notifies (step S113) the sound control section 21 of the fact that the derivation of the motion detection threshold value is completed, the sound control section 21 receives (step S103) this notification, and then outputs (step S104) the renewed volume setting value having been adjusted to the sound output section 39. As a result, the sound is output from the speaker 40 at the volume corresponding to the renewed volume setting value.

Figure 5A:
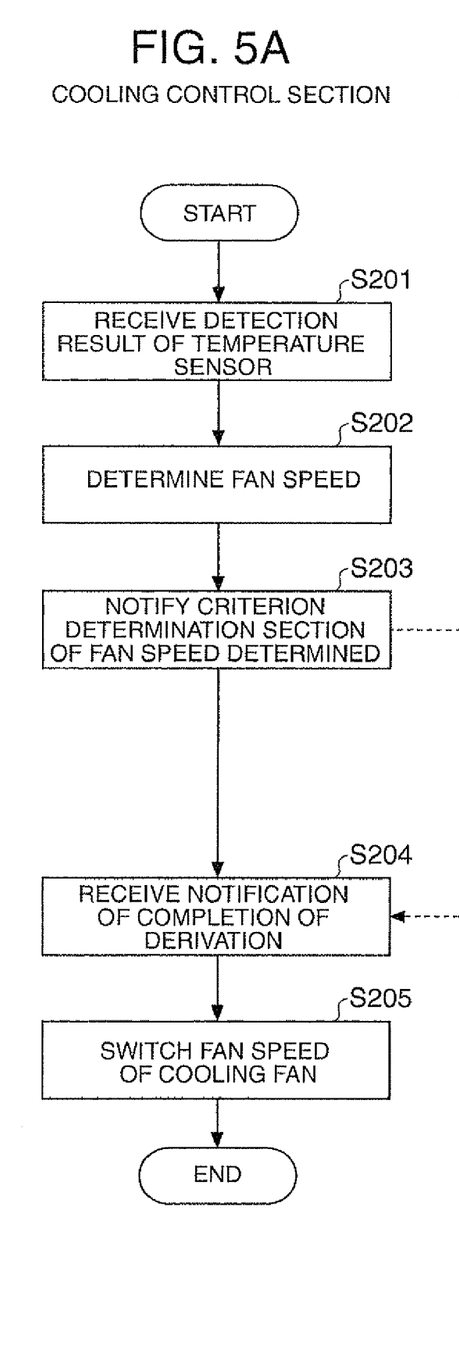
FIGS. 5A and 5B are flowcharts for explaining the operations of a cooling control section and a criterion determination section when determining the motion detection threshold value.
Figure 5B:
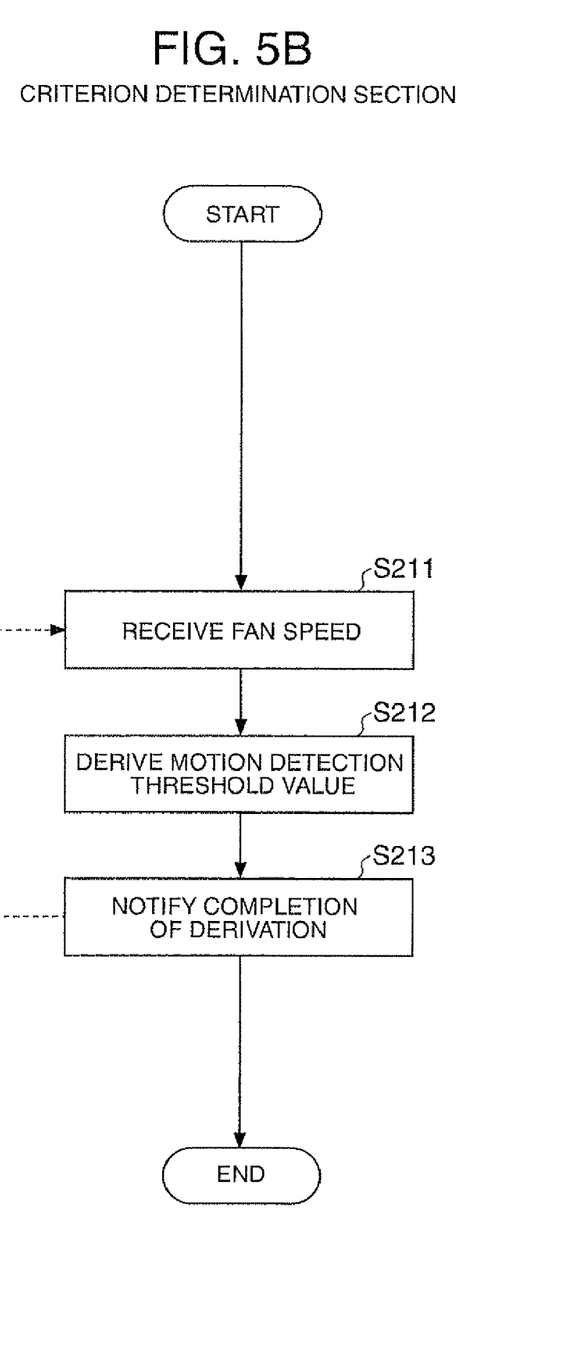

FIGS. 5A and 5B are flowcharts for explaining the operations of the cooling control section 22 and the criterion determination section 24 when determining the motion detection threshold value, wherein FIG. 5A shows the operation of the cooling control section 22, and FIG. 5B shows the operation of the criterion determination section 24. The cooling control section 22 repeats the flow shown in FIGS. 5A and 5B at a predetermined interval.

As shown in FIGS. 5A and 5B, the cooling control section 22 receives (step S201) the detection result (the detected temperature) from the temperature sensor 41, and then determines (step S202) the fan speed based on the detected temperature. Subsequently, the cooling control section 22 notifies (step S203) the criterion determination section 24 of the fan speed thus determined prior to rotating the cooling fan 42 at this fan speed. When receiving (step S211) the fan speed notified by the cooling control section 22, the criterion determination section 24 derives (step S212) a renewed motion detection threshold value from the correspondence table T based on the fan speed thus notified and the volume setting value having ever been received from the sound control section 21, and then stores the renewed motion detection threshold value. Subsequently, when the criterion determination section 24 notifies (step S213) the cooling control section 22 of the fact that the derivation of the motion detection threshold value is completed, the cooling control section 22 receives (step S204) this notification, and then switches (step S205) the fan speed of the cooling fan 42 to the fan speed having been determined in the step S202. As a result, the cooling fan 42 rotates at the fan speed corresponding to the detection result of the temperature sensor 41.

As described above, when receiving the volume setting value from the sound control section 21, or receiving the fan speed from the cooling control section 22, the criterion determination section 24 derives the renewed motion detection threshold value based on the value and the speed. In other words, the criterion determination section 24 changes the motion detection threshold value as needed every time the volume setting value or the fan speed changes.

Going back to FIG. 2, the correction control section 25 performs control for adjusting (correcting) the projection conditions of an image, namely the focus condition, the zoom condition, and the deformation state of the image due to the keystone distortion, based on the instruction of the motion determination section 23. Specifically, the correction control section 25 instructs the image processing section 34 to project the test image for adjusting the projection conditions from the image projection section 10, and at the same time, makes the imaging section 44 image the test image thus projected. Subsequently, the correction control section 25 analyzes the imaging data (the shot image), and then controls the lens drive section 45 so that the projected image becomes in the appropriate focus condition and zoom condition, and at the same time, derives the correction information for correcting the keystone distortion and then outputs the correction information to the keystone distortion correction section 35.

More specifically, the correction control section 25 derives the distances from the projector 1 to a plurality of points on the screen SC using the principle of triangulation based on the shot image of the imaging section 44. Subsequently, the correction control section 25 obtains the tilt of the projector 1 with respect to the projection surface based on the distances to the respective points thus derived, and then derives the correction information for correcting the keystone distortion corresponding to the tilt. Further, the correction control section 25 derives the distance from the projector 1 to the point at roughly the center of the projected image based on the shot image of the imaging section 44, and at the same time performs the adjustment of the focus condition based on the distance. Further, the correction control section 25 detects a frame (a screen frame) of the screen SC from the shot image using an edge detection process or the like, and performs the adjustment of the zoom condition so that the largest possible image is projected inside the screen frame.

Figure 6:
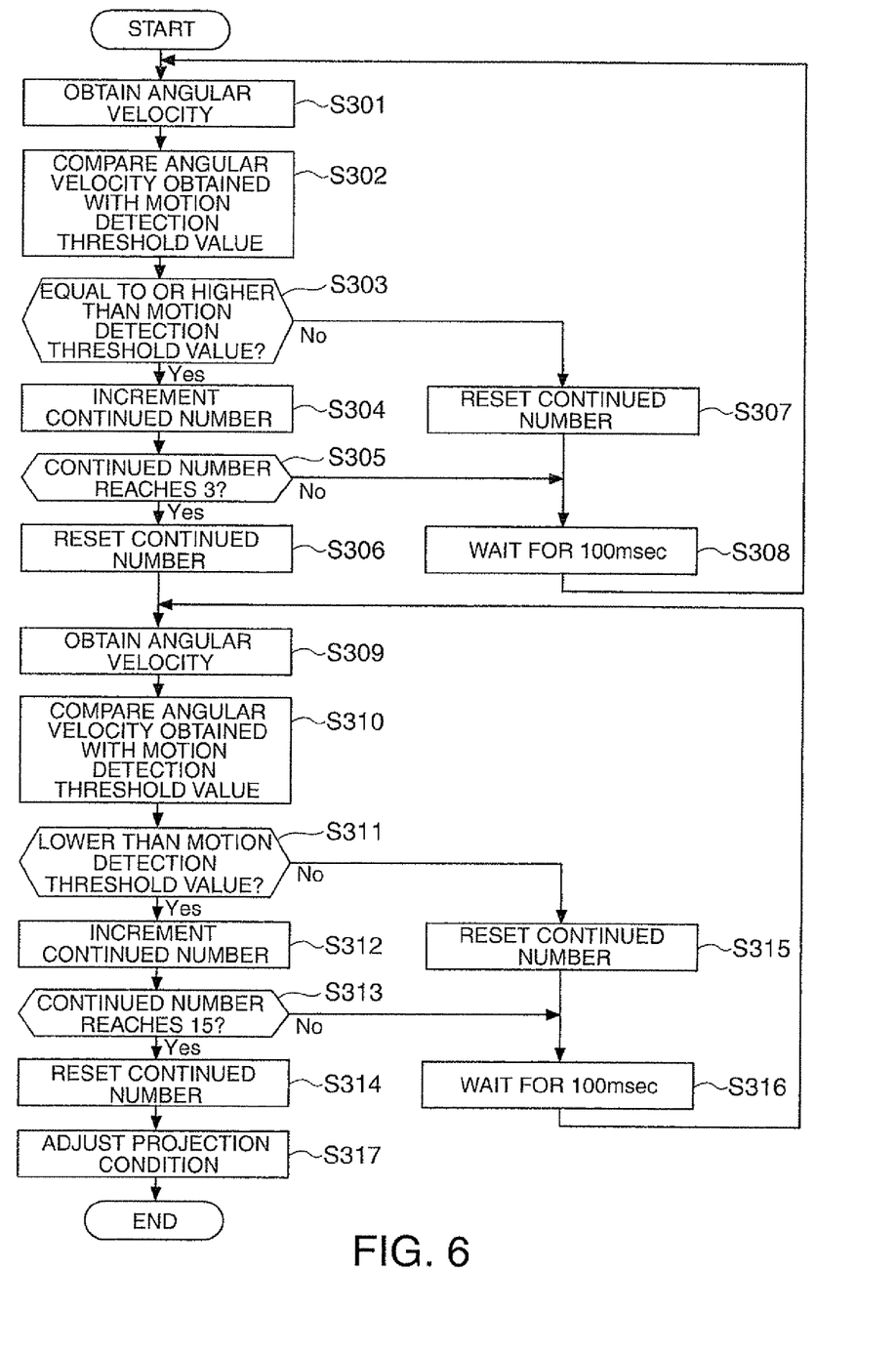
FIG. 6 is a flowchart for explaining the operation of a motion determination section.

FIG. 6 is a flowchart for explaining the operation of a motion determination section 23. The motion determination section 23 of the present embodiment determines that the projector 1 is in the moving state when the detection result of the angular velocity sensor is kept higher than the motion detection threshold value during a predetermined period of time, and determines that the projector 1 is in the resting state when it is kept lower than the motion detection threshold value during a predetermined period of time. Further, it is arranged that when the projector 1 has made a transition from the moving state to the resting state, the motion determination section 23 determines that the installation operation (the adjustment operation of the installation condition) by the user has been completed, and automatically (independently of the input operation of the user) performs the adjustment of the projection conditions by the control of the correction control section 25.

As shown in FIG. 6, in the step S301, the motion determination section 23 makes the angular velocity sensor detect the angular velocity, and then obtains the detection result (the angular velocity) from the angular velocity sensor 43.

In the step S302, the motion determination section 23 compares the angular velocity thus obtained from the angular velocity sensor 43 with the motion detection threshold value thus derived in the criterion determination section 24, and in the subsequent step, the step S303, the motion determination section 23 determines whether or not the angular velocity thus obtained is equal to or higher than the motion detection threshold value. Then, if it is equal to or higher than the motion detection threshold value, the process proceeds to the step S304, and if it is lower than the motion detection threshold value, the process proceeds to the step S307.

In the case in which the angular velocity thus obtained is equal to or higher than the motion detection threshold value, and the process has proceeded to the step S304, the motion determination section 23 increments a continued number for counting the number of times of the fact that the angular velocity thus obtained is equal to or higher than the motion detection threshold value by one.

In the step S305, the motion determination section 23 determines whether or not the continued number having been incremented reaches a predetermined value (three in the present embodiment). Then, if the continued number has reached the predetermined value, the process proceeds to the step S306 to reset the continued number to zero, and then further proceeds to the step S309. On the other hand, if the continued number has not reached the predetermined value, the process proceeds to the step S308.

In the step S303, if the angular velocity thus obtained is lower than the motion detection threshold value, and the process has proceeded to the step S307, the motion determination section 23 resets the continued number to zero. Then, in the step S308, the motion determination section 23 waits for a predetermined time (100 msec in the present embodiment), and then the process returns to the step S301.

As described above, in the steps S301 through S308, the motion determination section 23 obtains the angular velocity from the angular velocity sensor 43 every 100 msec. Then, if the angular velocity thus obtained is equal to or higher than the motion detection threshold value in three consecutive turns, the motion determination section 23 determines that the projector 1 is in the moving state, and the process proceeds to the step S309.

If it is determined that the projector 1 is in the moving state, and the process has proceeded to the step S309, the motion determination section 23 makes the angular velocity sensor 43 detect the angular velocity, and then obtains the detection result (the angular velocity) from the angular velocity sensor 43.

In the step S310, the motion determination section 23 compares the angular velocity thus obtained from the angular velocity sensor 43 with the motion detection threshold value thus derived in the criterion determination section 24, and in the subsequent step, the step S311, the motion determination section 23 determines whether or not the angular velocity thus obtained is lower than the motion detection threshold value. Then, if it is lower than the motion detection threshold value, the process proceeds to the step S312, and if it is equal to or higher than the motion detection threshold value, the process proceeds to the step S315.

In the case in which the angular velocity thus obtained is lower than the motion detection threshold value, and the process has proceeded to the step S312, the motion determination section 23 increments a continued number for counting the number of times of the fact that the angular velocity thus obtained is lower than the motion detection threshold value by one.

In the step S313, the motion determination section 23 determines whether or not the continued number having been incremented reaches a predetermined value (fifteen in the present embodiment). Then, if the continued number has reached the predetermined value, the process proceeds to the step S314 to reset the continued number to zero, and then further proceeds to the step S317. On the other hand, if the continued number has not reached the predetermined value, the process proceeds to the step S316.

In the step S311, if the angular velocity thus obtained is equal to or higher than the motion detection threshold value, and the process has proceeded to the step S315, the motion determination section 23 resets the continued number to zero. Then, in the step S316, the motion determination section 23 waits for a predetermined time (100 msec in the present embodiment), and then the process returns to the step S309.

As described above, also in the steps S309 through S316, the motion determination section 23 obtains the angular velocity from the angular velocity sensor 43 every 100 msec. Then, if the angular velocity thus obtained is lower than the motion detection threshold value in fifteen consecutive turns, the motion determination section 23 determines that the projector 1 is in the resting state, and the process proceeds to the step S317.

Then, in the step S317, the motion determination section 23 instructs the correction control section 25 to start the process for adjusting (correcting) the projection conditions (the focus condition, the zoom condition, and the deformation condition of the image due to the keystone distortion) described above, and then the flow is terminated.

As explained hereinabove, according to the projector 1 of the present embodiment, the following advantages can be obtained.

According to the projector 1 of the present embodiment, the criterion determination section 24 determines the criterion (the motion detection threshold value) for determining whether the projector 1 is in the moving state or in the resting state in accordance with the volume setting value and the fan speed. In other words, since the criterion is changed in accordance with the volume setting value and the fan speed, it becomes possible to perform determination between the moving state and the resting state taking the vibration generated by the speaker 40 or the cooling fan 42 into consideration, and thus it becomes possible to perform more accurate determination. Specifically, since the motion detection threshold value is increased if the volume setting value or the fan speed is equal to or higher than a predetermined value, it can be prevented that the false determination of the moving state is made due to the vibration of the speaker 40 or the cooling fan 42 despite the user not touching the projector 1. Further, since the motion detection threshold value is decreased if the volume setting value or the fan speed is lower than the predetermined value, the determination with high sensitivity becomes possible, and the situation (the false determination) that the determination of the moving state fails to be made despite the user performing the installation operation can be prevented.

It should be noted that in the present embodiment the angular velocity sensor 43 corresponds to a detection section, the motion determination section 23 corresponds to a determination section, and the correction control section 25 corresponds to an adjustment section. Further, the speaker 40 for producing sounds and the cooling fan 42 for cooling the projector 1 each correspond to an auxiliary operation section for auxiliary supporting the projection of an image by performing an operation with vibration. Further, the steps S301 through S316 correspond to the step of determining whether the projector 1 is in the moving state or in the resting state, the step S317 corresponds to the step of adjusting, and the steps S112 and S212 each correspond to the step of determining the criterion.

Modified Example

Further, the embodiment described above can be modified as follows.

Figure 7:
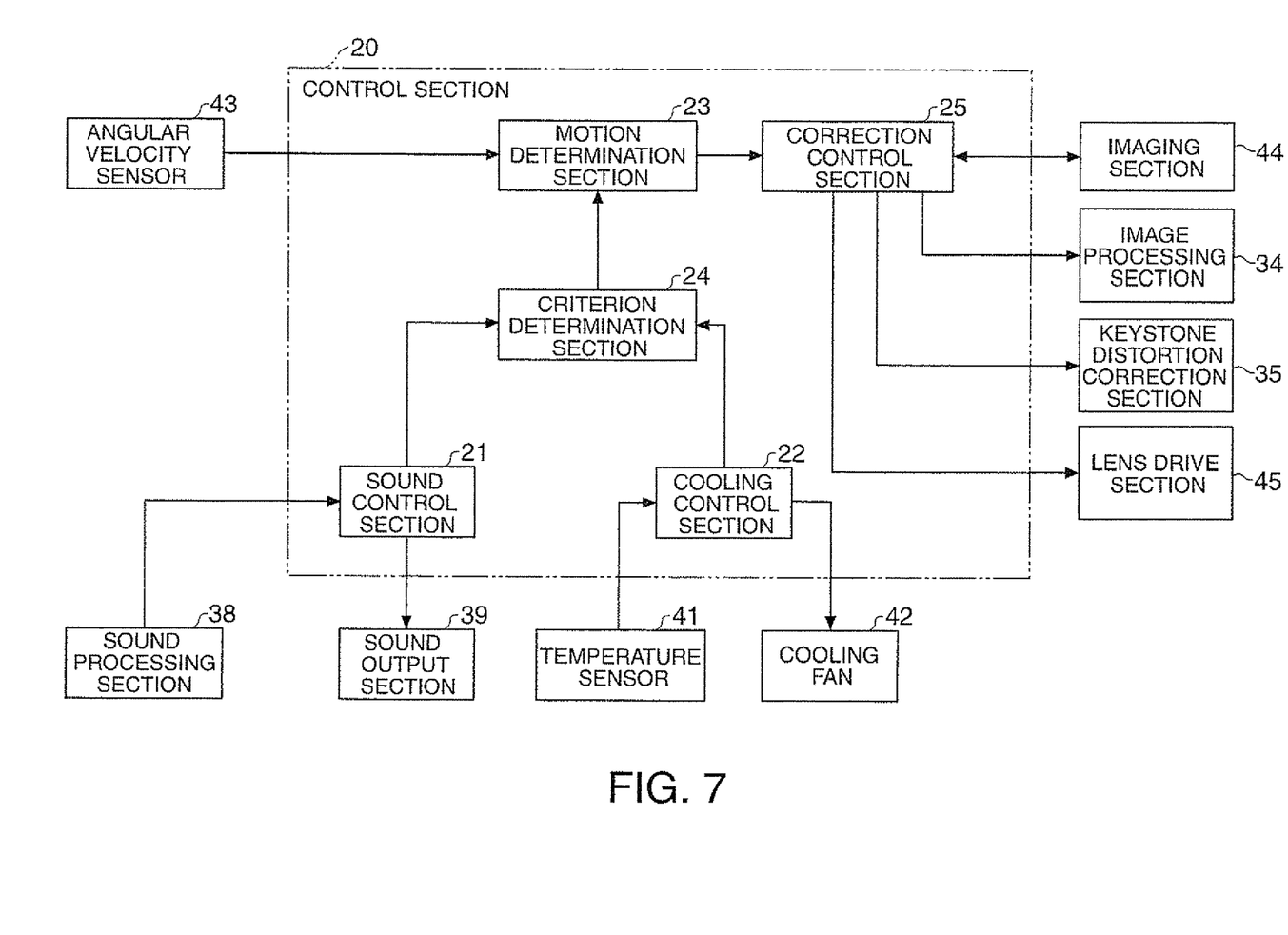
FIG. 7 is a functional block diagram showing the function of a control section according to a modified example.

Although in the embodiment described above it is arranged that the criterion determination section 24 determines the criterion (the motion detection threshold value) based on the volume setting value set by the user, it is possible to arrange that the criterion is determined based on the volume of the sound actually output from the speaker 40. For example, as shown in FIG. 7, by arranging that the sound information is output from the sound processing section 38 to the sound control section 21, the sound control section 21 can estimate the volume of the sound having been actually output from the speaker 40 at the time point when the angular velocity sensor 43 has detected the angular velocity based on the sound information input from the sound processing section 38 and the volume setting value set by the user. Further, it is possible to arrange that the criterion determination section 24 determines the motion detection threshold value based on the volume.

Although in the embodiment described above it is arranged that the angular velocity sensor 43 detects the motion of the projector 1, a measure for detecting the motion of the projector 1 is not limited thereto. For example, it is possible to use an acceleration sensor, or to use an optical sensor for emitting a light beam toward a mounting surface, and receiving the reflected light beam from the mounting surface to thereby detecting the motion of the projector.

Although in the embodiment described above there is described the aspect in which the criterion (the motion detection threshold value) is determined in accordance with both of the volume of the sound produced by the speaker 40 and the rotational speed of the cooling fan 42, it is also possible to arrange that the criterion is determined based on either one of them.

In the embodiment described above, in the case in which the cooling fan 42 is configured including a plurality of fans and the fan speeds thereof are different from each other, it is also possible to derive the motion detection threshold value using the average value thereof, or to derive the motion detection threshold value based on the fan speed of typical one of the cooling fans 42.

Although in the embodiment described above, the focus adjustment, the zoom adjustment, and the keystone distortion correction are performed as the adjustment (correction) of the projection conditions, an aspect of performing either one of the adjustments can also be adopted besides the aspect of performing all of the adjustments. Further, the adjustment method is not limited to the method presented in the embodiment described above, but various methods can also be used. Further, it is also possible to arrange that adjustments (e.g., an adjustment of the colors, or an adjustment of the luminance of the light source) of the projection conditions other than those described above are also performed.

Although in the embodiments described above the three-panel projector 1 using the three liquid crystal light valves 12R, 12G, and 12B as the light modulation device is explained, the invention is not limited thereto. For example, it is also possible to adopt an aspect of forming the image with a single liquid crystal light valve having the pixels 12$p$ each including sub-pixels capable of respectively transmitting the R light, G light, and B light.

Although in the embodiments described above the transmissive liquid crystal light valves 12R, 12G, and 12B are used as the light modulation device, it is also possible to use reflective light modulation devices such as reflective liquid crystal light valves. Further, it is also possible to use a micromirror array device for modulating the light emitted from the light source by controlling the emission direction of the incident light for every micromirror as a pixel.

Although in the embodiment described above, the light source device 11 is configured with the discharge light source lamp 11$a$, a sold-state light source such as a light emitting diode (LED) light source or other light sources can also be used therefor.

What is claimed is:

1. A projector adapted to project an image, comprising:
    a detection section adapted to detect a motion of the projector;
    a determination section adapted to compare a detection result of the detection section with a predetermined criterion to perform determination on whether the projector is in a moving state or in a resting state;
    an adjustment section adapted to begin adjustment of a projection condition of the image in response to a transition of a determination result of the determination section from the moving state to the resting state;
    an auxiliary operation section adapted to auxiliary support the projection of the image by performing an operation with vibration, the auxiliary operation section including a cooling fan adapted to cool the projector; and
    a criterion determination section adapted to change the criterion based on an operation state of the auxiliary operation section, wherein
    the criterion determination section changes the criterion in accordance with a rotational speed of the cooling fan.

2. The projector according to claim 1 wherein
    the detection section includes an angular velocity sensor adapted to detect an angular velocity,
    the determination section compares the angular velocity detected by the detection section and the criterion with each other to determine whether the projector is in the moving state or in the resting state, and
    the criterion determination section sets the criterion so that the higher the rotational speed of the cooling fan is, the higher the criterion is.

3. The projector according to claim 1, wherein
the detection section includes an acceleration sensor adapted to detect an acceleration,
the determination section compares the acceleration detected by the detection section and the criterion with each other to determine whether the projector is in the moving state or in the resting state, and
the criterion determination section sets the criterion so that the higher the rotational speed of the cooling fan is, the higher the criterion is.

4. The projector according to claim 1, wherein
the auxiliary operation section includes a sound production section adapted to produce a sound, and
the criterion determination section changes the criterion in accordance with a volume of the sound produced by the sound production section.

5. The projector according to claim 4, wherein
the detection section includes an angular velocity sensor adapted to detect an angular velocity,
the determination section compares the angular velocity detected by the detection section and the criterion with each other to determine whether the projector is in the moving state or in the resting state, and
the criterion determination section sets the criterion so that the higher the volume of the sound is, the higher the criterion is.

6. The projector according to claim 4, wherein
the detection section includes an acceleration sensor adapted to detect an acceleration,
the determination section compares the acceleration detected by the detection section and the criterion with each other to determine whether the projector is in the moving state or in the resting state, and
the criterion determination section sets the criterion so that the higher the volume of the sound is, the higher the criterion is.

7. The projector according to claim 1, wherein
the adjustment section corrects keystone distortion of the image.

8. The projector according to claim 1, wherein
the adjustment section adjusts a focus condition of the image.

9. The projector according to claim 1, wherein
the adjustment section adjusts a zoom condition of the image.

10. A method of controlling a projector adapted to project an image, comprising the steps of:
(a) performing determination on whether the projector is in a moving state or in a resting state by detecting a motion of the projector to compare the motion with a predetermined criterion;
(b) beginning an adjustment of a projection condition of the image in response to a transition of a determination result in step (a) from the moving state to the resting state; and
(c) changing the criterion based on an operation state of an auxiliary operation section adapted to auxiliary support the projection of the image by performing an operation with vibration, wherein
the auxiliary operation section includes a cooling fan adapted to cool the projector, and
the changing of the criterion is in accordance with a rotational speed of the cooling fan.

11. A projector adapted to project an image, comprising:
a detection section adapted to detect a motion of the projector;
a determination section adapted to compare a detection result of the detection section with a predetermined criterion to perform determination on whether the projector is in a moving state or in a resting state;
an adjustment section adapted to begin adjustment of a projection condition of the image in response to a transition of a determination result of the determination section from the moving state to the resting state;
an auxiliary operation section adapted to auxiliary support the projection of the image by performing an operation with vibration; and
a criterion determination section adapted to change the criterion based on a operation state of the auxiliary operation section,
wherein
the auxiliary operation section includes a sound production section adapted to produce a sound,
the criterion determination section changes the criterion in accordance with a volume of the sound produced by the sound production section,
the detection section includes an angular velocity sensor adapted to detect an angular velocity,
the determination section compares the angular velocity detected by the detection section and the criterion with each other to determine whether the projector is in the moving state or in the resting state, and
the criterion determination section sets the criterion so that the higher the volume of the sound is, the higher the criterion is.

* * * * *